(12) United States Patent
Lee et al.

(10) Patent No.: US 10,710,498 B2
(45) Date of Patent: Jul. 14, 2020

(54) CUSTOMIZABLE, VISUAL IDENTIFIERS FOR TRANSPORTATION SERVICE VEHICLES

(71) Applicant: Ford Global Technologies, LLC, Dearborn, MI (US)

(72) Inventors: Marquez Lee, Dearborn, MI (US); Juan Pasquier, Dearborn, MI (US); Mark McCluskey, Dearborn, MI (US); Joy Mountford, Dearborn, MI (US); Jennifer L. Brace, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/479,998

(22) PCT Filed: Jan. 30, 2017

(86) PCT No.: PCT/US2017/015649
§ 371 (c)(1),
(2) Date: Jul. 23, 2019

(87) PCT Pub. No.: WO2018/140059
PCT Pub. Date: Aug. 2, 2018

(65) Prior Publication Data
US 2019/0366917 A1 Dec. 5, 2019

(51) Int. Cl.
G08G 1/017 (2006.01)
H04W 4/40 (2018.01)
B60Q 1/50 (2006.01)
B60Q 1/26 (2006.01)
G01C 21/34 (2006.01)

(52) U.S. Cl.
CPC .......... B60Q 1/503 (2013.01); B60Q 1/2696 (2013.01); *G01C 21/3438* (2013.01); *H04W 4/40* (2018.02)

(58) Field of Classification Search
None
See application file for complete search history.

(56) References Cited

U.S. PATENT DOCUMENTS

2010/0323672 A1* 12/2010 Chen ............... H04M 1/56
455/414.1
2015/0348408 A1* 12/2015 Demisse ............ G08G 1/017
340/933
2017/0210285 A1* 7/2017 Kobayashi ........... B60Q 1/50

* cited by examiner

*Primary Examiner* — John F Mortell
(74) *Attorney, Agent, or Firm* — Brandon Hicks; Eversheds Sutherland (US) LLP

(57) ABSTRACT

A method for providing customizable, visual identifiers for transportation service vehicles. The method includes receiving a request for a transportation vehicle from a user. A unique identifier associated with the user may be generated in response to the request. The unique identifier may then be automatically transmitted to the vehicle and displayed on an illuminated display that is visible from an exterior of the vehicle. A corresponding system is also disclosed and claimed herein.

18 Claims, 6 Drawing Sheets

CUSTOMIZABLE, VISUAL IDENTIFIERS FOR TRANSPORTATION SERVICE VEHICLES

FIELD OF THE INVENTION

This invention relates to systems and methods for identifying transportation service vehicles.

BACKGROUND OF THE INVENTION

In modern cities, ridesharing transportation services are nearly as ubiquitous as taxicabs. Ridesharing services generally allow customers to submit a trip request via an app on their smartphone. A software program associated with the app alerts service drivers in the area to the request, and provides the location of the customer to the first driver that accepts the request. The appropriate fare is automatically calculated and payment transferred to the driver without any additional effort required on the part of the customer.

The great success of the ridesharing industry is largely attributable to the high availability of rideshare vehicles combined with the ease and simplicity of use of ridesharing service programs. The combination of these features virtually guarantees that a customer will be able to secure a rideshare vehicle with minimal wait time and inconvenience.

Once a request for a rideshare vehicle has been accepted by a driver, the requesting customer is typically provided with driver information (e.g., name and photo) and vehicle information (e.g., license plate number, vehicle make and model, and vehicle photo) to enable the customer to identify the vehicle at pickup. Correctly identifying the rideshare vehicle at pickup may be difficult, however, since various service providers use similar vehicles in the same colors, and since license plate numbers and drivers are only identifiable in good lighting and at short distances. This may cause undue stress for a customer, particularly where the pickup point is an airport or other high traffic location. In some situations, the customer may actually get into the wrong vehicle, causing the customer embarrassment and the service company a potential loss of business.

Accordingly, what are needed are systems and methods to facilitate a customer's ability to correctly identify a requested vehicle at pickup. Ideally, such systems and methods would provide a unique, customizable visual identifier for display on the exterior of the requested vehicle. Such systems and methods may also provide large, illuminated projections or displays visible at day and night to enable quick and easy identification.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
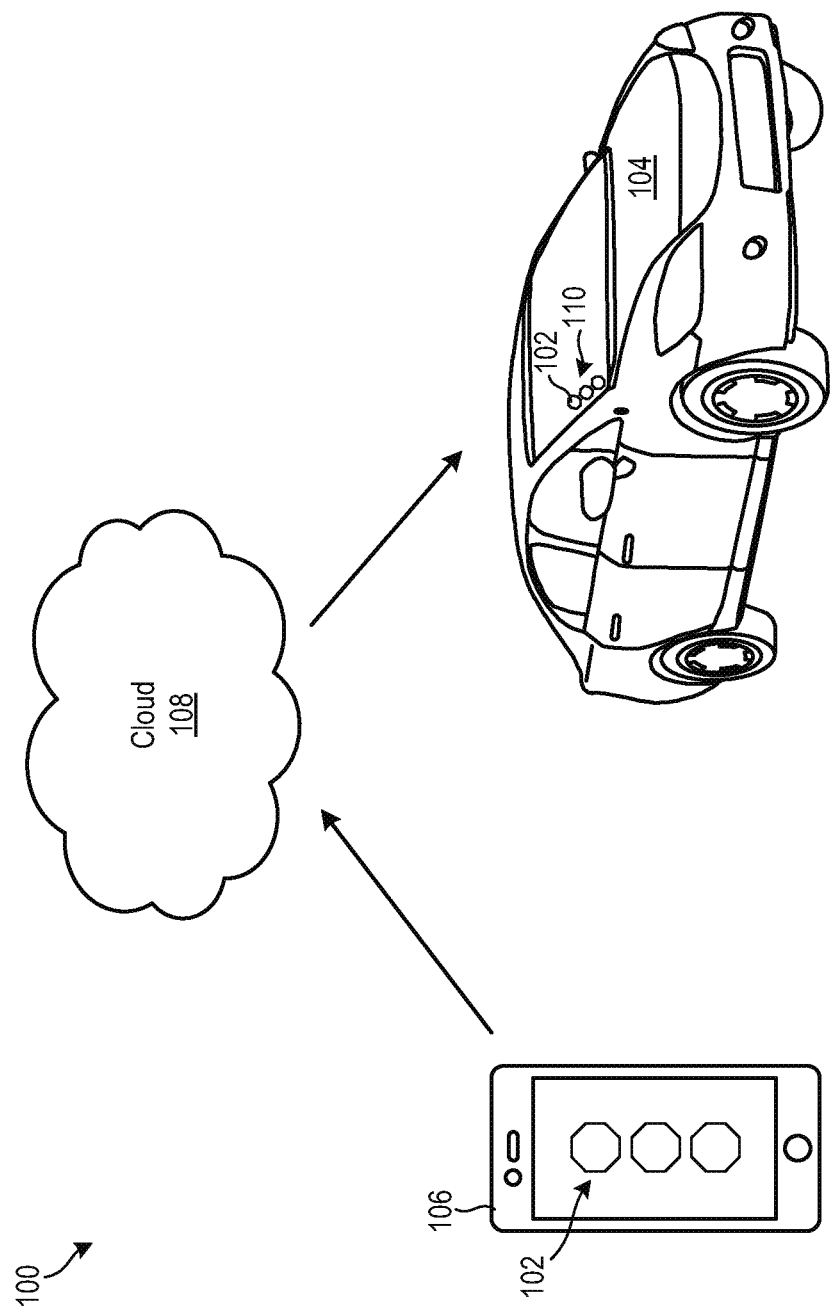
FIG. 1 is a high-level schematic diagram of a system for identifying a transportation service vehicle in accordance with the invention.

Referring to FIG. 1, ridesharing transportation services have become hugely popular due to their ease and simplicity of use, customized routes, and relative anonymity. The same features that make ridesharing services appealing to customers, however, may make it difficult for a customer to accurately identify a ridesharing vehicle at pickup. For example, since many ridesharing transportation service companies utilize black luxury vehicles, it may be difficult for a customer to properly identify the correct vehicle at a crowded location such as an airport.

While ridesharing transportation service companies typically provide customers with vehicle and driver information and photos to facilitate proper identification, even this information may be inadequate at night or under low light conditions. Indeed, discerning between numbers on a license plate or identifying facial features of a driver may be nearly impossible with limited light, unless the customer happens to be very close to the vehicle.

As shown in FIG. 1, certain embodiments of a system 100 in accordance with the present invention may provide customizable, visual identifiers 102 to facilitate customer identification of a transportation service vehicle 104 on pickup. As shown, the system 100 may include a computing device such as a mobile computing device 106. A mobile computing device 106 may include a smartphone, a tablet, a laptop, a personal digital assistant, a smartwatch, or the like.

The mobile computing device 106 may include application or other program software to enable a user to request a transportation service vehicle 104 in cities or regions where an associated transportation service operates. The application or other program software may transmit the request from the mobile computing device 106 to nearby transportation service vehicles 104 associated with the transportation service via, for example, a cloud-based or other remote server 108. As shown, a visual identifier 102 to assist the user in being able to identify the transportation service vehicle 104 may also be submitted to nearby transportation service vehicles 104 in connection with the user request, or may be generated and/or submitted to the transportation service vehicle 104 after that transportation service vehicle 104 has accepted the user request for transportation.

In some embodiments, as discussed in more detail below, the user may customize the visual identifier 102 by handwriting, drawing, or selecting a unique symbol, pattern, design, image, and/or color or combination of colors by which to identify the requested transportation service vehicle 104. In other embodiments, the visual identifier 102 may be automatically generated and associated with the user by the application or other program software. In any case, the visual identifier 102 may be temporarily or permanently associated with the user and stored on the cloud-based or other remote server 108 for future use, or may be immediately discarded after use.

Upon accepting the user request and receiving the associated visual identifier 102, the transportation service vehicle 104 may display the visual identifier 102 on an illuminated display 110 visible from an exterior of the transportation service vehicle 104. An illuminated display 110 may include, for example, one or more light sources, such as light-emitting diode (LED) or organic light-emitting diode (OLED) light sources, visible through one or more windows of the transportation service vehicle 104. In one embodiment, for example, the visual identifier 102 may be displayed on an OLED display 110 visible through the transportation service vehicle 104 windshield, as well as on an OLED display 110 visible through a vehicle 104 window. Alternatively, the illuminated display 110 may be attached to an exterior of the transportation service vehicle 104 or integrated with the body of the vehicle 104. In certain embodiments, as discussed in detail with reference to FIGS. 5 and 6 below, the illuminated display 110 may include one or more lighting elements coupled to an exterior of the transportation service vehicle 104.

Figure 2:
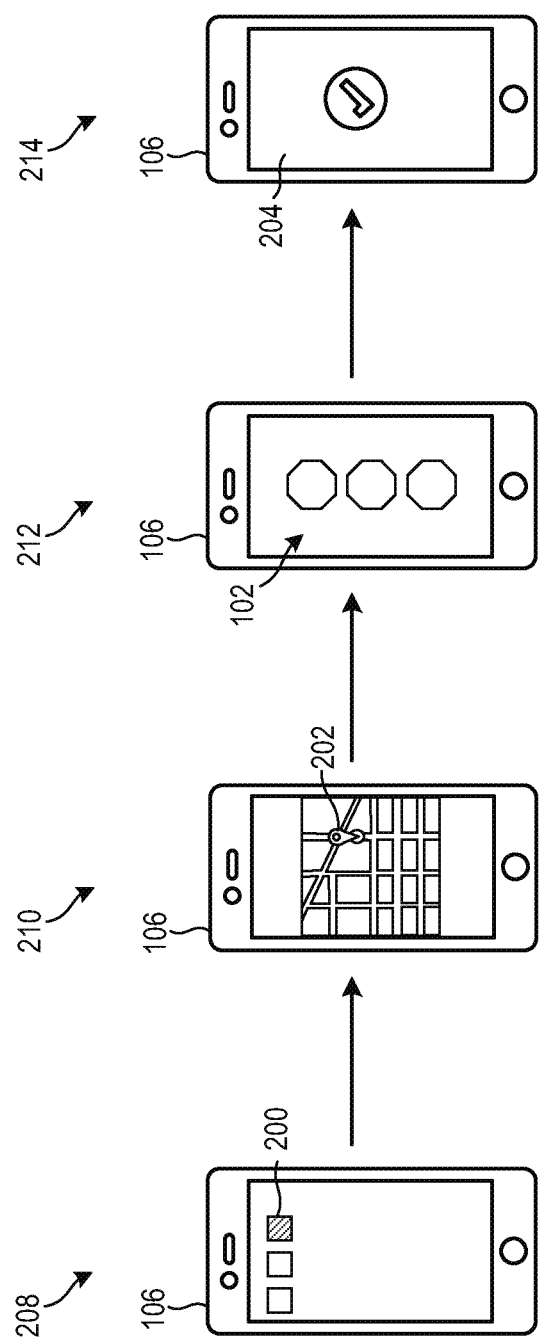
FIG. 2 is a flow diagram for automatically generating a visual identifier for a transportation service vehicle in accordance with certain embodiments of the invention.

In one embodiment, as shown in FIG. 2, a visual identifier 102 may be automatically generated by application or other program software without requiring any additional input or effort by the user. For example, in some embodiments, a user may sign up to create an account with a desired rideshare or other transportation service. As part of the signup process, the user may create a unique visual identifier 102 by handwriting, drawing, or selecting a desired symbol, photograph, or other designation in any color or color combination. Alternatively, a unique visual identifier 102 associated with the user may be automatically generated during the signup process or at another time, as set forth below. In any case, this visual identifier 102 may be associated and stored with the user account such that when a transportation service vehicle 104 is requested, the visual identifier 102 may be automatically sent to the vehicle 104 that accepts the request.

After signing up, associated application software may be downloaded and installed on a mobile computing device 106 associated with the user. The user may launch the application software by selecting 208 the corresponding application icon 200 from those displayed on the mobile computing device 106.

Selecting 208 the application icon 200 may cause a login prompt to be displayed. The user may then sign in with the credentials used during the signup process. In some embodiments, the login prompt may require the user to identify or enter the visual identifier 102. The user may also link a credit card or other payment method to the user account to facilitate a cash-free environment. In some embodiments, the visual identifier 102 may be automatically generated and associated with the user account after the user has logged into the application software.

The application software may then enable the user to request 210 a transportation service vehicle 104. In certain embodiments, the application may allow users to request 210 a transportation service vehicle 104 based on their location 202, or based on manual input. The application software may automatically identify the user's location 202 based on GPS information associated with the mobile computing device 106. This information may then be used to identify nearby transportation service vehicles 104 and/or to determine the pickup location.

The application software may then automatically generate and/or display 212 a visual identifier 102 associated with the user account. As previously discussed, the visual identifier 102 may be a substantially unique colorized pattern, single or multiple shapes, symbols, words, designs, photographs, or any other such designation known to those in the art.

When the user request 210 has been accepted by a nearby transportation service vehicle 104, the application software may confirm 214 the request 210 and associated visual identifier 102 via a confirmation screen 204 displayed on the mobile computing device 106. The visual identifier 102 associated with the user account may be displayed such that is visible on an exterior of the requested transportation service vehicle 104 upon arrival of the transportation service vehicle 104 at the pickup location.

Figure 3:
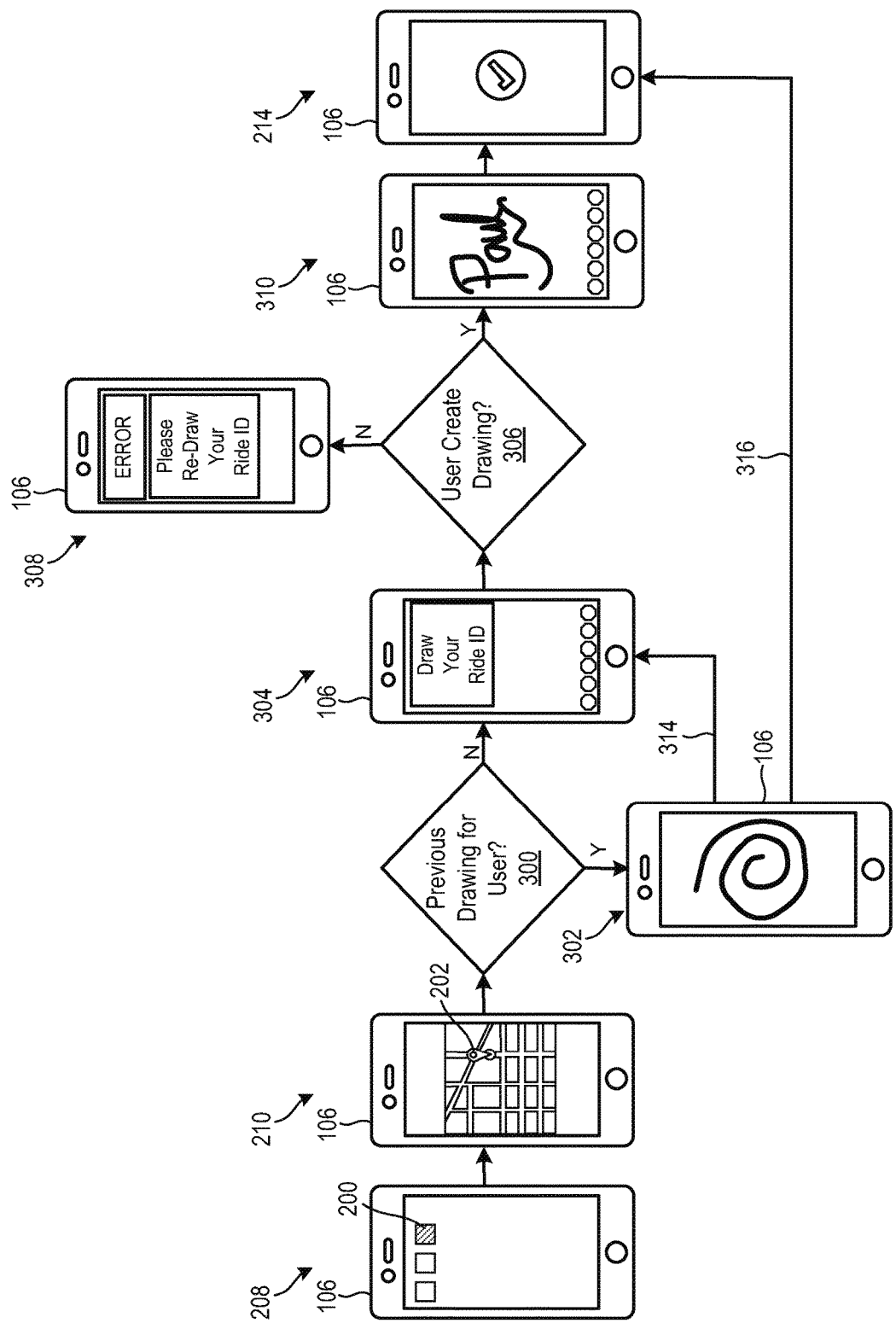
FIG. 3 is a flow diagram for generating a customizable visual identifier for a transportation service vehicle in accordance with the invention.

Referring now to FIG. 3, in some embodiments, users may choose to customize a new visual identifier 102 each time a transportation service vehicle 104 is requested, or may select a visual identifier 102 previously associated with their account. In other embodiments, as discussed above, a visual identifier 102 may be automatically generated and associated with a user account and/or a user request 210 without requiring input from the user.

As shown, a mobile computing device 106 may display an application icon 200 representing a rideshare or other transportation service. Upon selecting 208 the application icon 200 to launch the application software, the user may request 210 a transportation service vehicle 104. The user's desired pickup location 202 may be identified by utilizing GPS information associated with the mobile computing device 106, or based upon manual input from the user. This information may then be used to identify nearby transportation service vehicles 104 available to respond to the request 210, and/or to determine an appropriate pickup location.

The application software may query 300 whether a visual identifier 102 has been previously generated and associated with the user. If yes, the previous visual identifier 102 may be displayed 302 to the user, and the user may be prompted to select whether to re-use 316 the previously generated visual identifier 102, or to create 314 a new visual identifier 102 for this trip. If the user chooses to re-use 316 the previously generated visual identifier 102, the previously-generated visual identifier 102 may be associated with the current user request 210 and the request 210 may be confirmed 214 with the user. The previously-generated visual identifier 102 may then be displayed such that it is visible on the exterior of the transportation service vehicle 104 upon arrival of the transportation service vehicle 104 at the pickup location.

If, however, the user chooses to create 314 a new visual identifier 102 for the current trip, the user may be prompted 304 to draw or select any shape, symbol, photograph, or the like, using any color or combination of colors. The new visual identifier 102 thus created may be displayed such that it is visible on the exterior of the transportation service vehicle 104 at pickup, as discussed in more detail below.

Creation of a new visual identifier 102 may be verified 306 and properly associated with the user's account prior to confirming 214 the user request 210 for a transportation service vehicle 104. In some cases, verifying 306 creation of a new visual identifier 102 includes verifying 306 that the visual identifier 102 satisfies certain pre-established parameters regarding, for example, size, content, and the like. For example, the new visual identifier 102 may be rejected if it is too small to be seen a predetermined distance away from the transportation service vehicle 104, or if any shape or wording is deemed explicit, offensive, or promotes a competitor.

If the newly-created visual identifier 102 cannot be properly verified 306, the application software may display 308 an error message and prompt the user to re-create a unique visual identifier 102 such as a colorized pattern, single or multiple shapes, symbols, words, designs, photographs, or the like. In some embodiments, a driver or other authorized user associated with the transportation service vehicle 104 may manually reject a confirmed visual identifier 102. In any case, if the visual identifier 102 does not meet certain parameters or requirements rendering it acceptable, the user may submit an alternate visual identifier 102, or an alternate visual identifier 102 may be automatically generated for display on the transportation service vehicle 104.

Upon verification, the newly-generated visual identifier 102 may be displayed 310 to the user prior to confirming 214 the user request 210. In some embodiments, the user may be required to confirm the newly-generated visual identifier 102 prior to confirming the user request 210. Upon proper acceptance and/or confirmation, the new visual identifier 102 will be displayed and visible on the exterior of the transportation service vehicle 104 at the designated pickup location.

Figure 4:
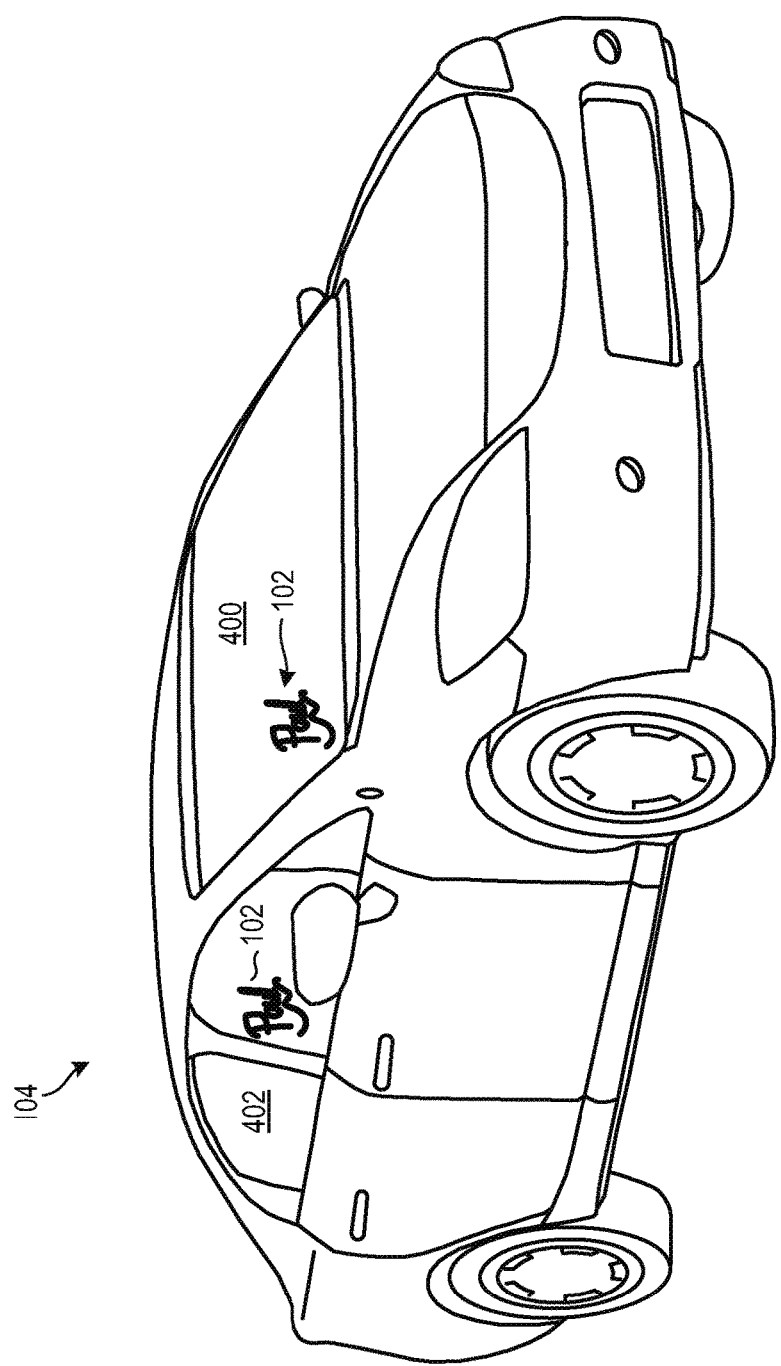
FIG. 4 is a perspective view of a transportation service vehicle having visual identifiers in accordance with one embodiment of the invention.

As shown in FIG. 4, the visual identifier 102 may be displayed on an exterior of the transportation service vehicle 104, or on an interior of the transportation service vehicle 104 such that it is visible on the exterior of the vehicle 104. For example, in some embodiments, the visual identifier 102 may be displayed on an interior of a windshield 400 or side window 402 of the transportation service vehicle 104 such that it is visible through the windshield 400 or side window 402 on the exterior of the vehicle 104. In some embodiments, the visual identifier 102 may be substantially integrated with the transportation service vehicle 104 windshield 400, side window 402, body, or other portion of the transportation service vehicle 104 such that it is visible at a location external to the transportation service vehicle 104.

Display of the visual identifier 102 may be automatically triggered by proximity of the transportation service vehicle 104 to the pickup location, or may be manually set or triggered by the driver or other authorized user associated with the transportation service vehicle 104, or by the user. In this manner, the user may control a level of anonymity associated with arrival of the transportation service vehicle 104 at the designated pickup location. In some embodiments, display of the visual identifier 102 may be delayed as needed to avoid confusing customers having similar visual identifiers 102 but different pickup locations.

Figure 5:
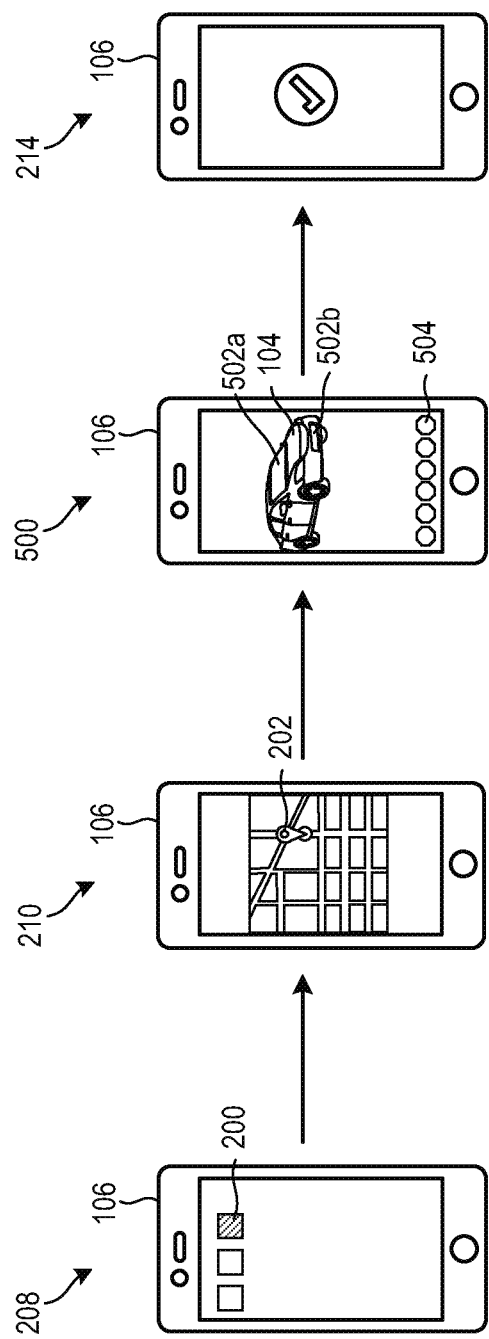
FIG. 5 is a flow diagram for generating customizable exterior vehicle lighting in accordance with embodiments of the invention.
Figure 6:
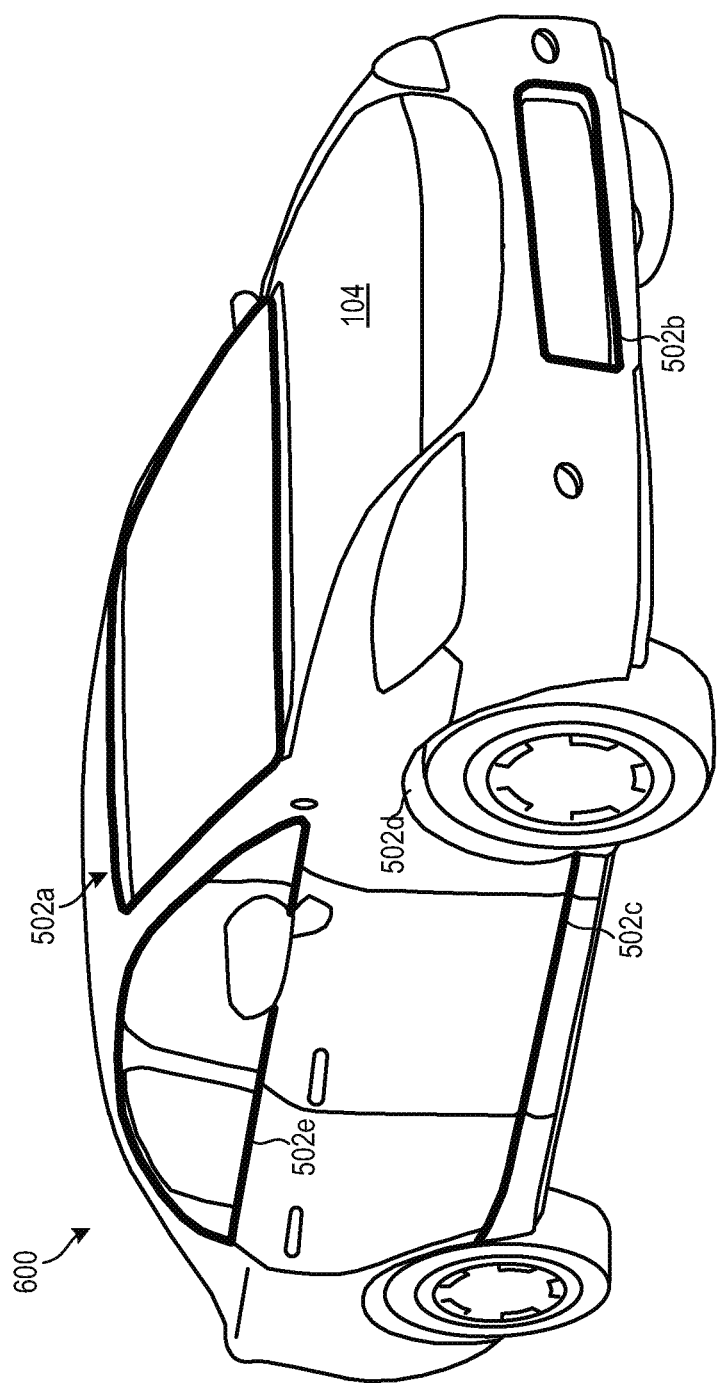
FIG. 6 is a perspective view of a transportation service vehicle having visual identifiers in accordance with a second embodiment of the invention.

Referring now to FIGS. 5 and 6, certain embodiments of the invention may allow a user to customize one or more exterior enhancement or accent lighting elements 600 on a transportation service vehicle 104. In this manner, exterior lighting elements 600 may act as a visual identifier 102. Exterior enhancement or accent lighting elements 600 may include, for example, a body lighting source such as Corning® Fibrance® Light-Diffusing Fiber, or any other such lighting source known to those in the art. Lighting elements 600 may be coupled to an exterior of the transportation service vehicle 104, and/or may be coupled to an interior of the transportation service vehicle 104 such that they are visible from a location external to the transportation service vehicle 104. In some embodiments, lighting elements 600 may be integrated with the transportation service vehicle 104.

As discussed above, a user may launch application software for a transportation service company by selecting 208 a corresponding application icon 200 from those displayed on a mobile computing device 106. After launching the application software, the user may request 210 a transportation service vehicle 104 from a current user location or from another designated pickup location 202. In one embodiment, as shown, the user may then select 500 an illumination pattern and/or color combination for the exterior enhancement or accent lighting elements 600 on the transportation service vehicle 104.

To this end, a representation of the transportation service vehicle 104 may be displayed 500 on the mobile computing device 106. Various areas 502*a-e* or portions of the representation of the transportation service vehicle 104 may be individually selectable by the user. The areas 502*a-e* selected by the user may illuminate in the color or color combination selected from a color array 504 upon arrival of the transportation service vehicle 104 at the pickup location.

In some embodiments, more than one illumination area 502*a-e* of the transportation service vehicle 104 may be selected to illuminate substantially concurrently. For example, a license plate area 502*b* of the transportation service vehicle 104 may be selected independently, or may be selected in combination with a windshield trim area 502*a*, a body accent line 502*c*, one or more wheel wells 502*d*, a window trim area 502*e* and/or the like. In other embodiments, multiple illumination areas 502*a-e* may be selected 500 to illuminate in succession, or in any order or pattern known to those in the art.

As previously mentioned, in certain embodiments, one or more colors may also be selected from a color array 504 displayed 500 to the user. The user may select one or more colors corresponding to each selected illumination area 502 *a-e* of the transportation service vehicle 104. In this manner, the user may create a highly customized visual identifier 102 that is easily visible at night and under low light conditions.

Optionally, in some embodiments, an algorithm may be implemented to prevent users in the same geographic region or having pickup locations in the same geographic vicinity from selecting or being able to select the same or substantially the same combination of illuminated areas 502*a-e* and colors for display on the transportation service vehicle 104.

Upon successful selection of a visual identifier 102 as set forth above, the user request 210 may be confirmed 214 to the user. The transportation service vehicle 104 may then display the selected illumination area pattern in the selected colors or color combination upon arrival at the user pickup location 202.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
receiving, from a user, a request for a vehicle for transportation;
generating, in response to the request, at least one unique identifier associated with the user;
automatically transmitting the unique identifier to the vehicle; and
automatically displaying the unique identifier on an illuminated display visible from an exterior of the vehicle, wherein generating at least one unique identifier comprises receiving at least one color selected by the user.

2. The method of claim 1, wherein generating at least one unique identifier comprises receiving at least one symbol selected by the user.

3. The method of claim 2, wherein the at least one symbol is handwritten.

4. The method of claim 1, wherein the illuminated display comprises at least one of an LED and an OLED light source.

5. The method of claim 1, wherein the illuminated display is located behind at least one of a vehicle windshield and a vehicle window.

6. The method of claim 1, wherein the illuminated display comprises exterior lighting coupled to a body of the vehicle.

7. The method of claim 6, wherein generating the at least one unique identifier comprises illuminating a portion of the illuminated display corresponding to a portion of the body of the vehicle selected by the user.

8. The method of claim 1, wherein the at least one unique identifier is unique within a specified geographic region.

9. The method of claim 1, wherein generating comprises automatically selecting a previously-generated identifier associated with the user.

10. A system comprising:
at least one processor; and
at least one memory device coupled to the at least one processor and storing instructions for execution on the at least one processor, the instructions causing the at least one processor to:
receive, from a user, a request for a vehicle for transportation;
generate, in response to the request, at least one unique identifier associated with the user;
automatically transmit the identifier to the vehicle; and
automatically display the unique identifier on an illuminated display visible from an exterior of the vehicle,
wherein generating at least one unique identifier comprises receiving at least one color selected by the user.

11. The system of claim 10, wherein generating at least one unique identifier comprises receiving at least one symbol selected by the user.

12. The system of claim 11, wherein the at least one symbol is handwritten.

13. The system of claim 10, wherein the illuminated display comprises at least one of an LED and an OLED light source.

14. The system of claim 10, wherein the illuminated display is located behind at least one of a vehicle windshield and a vehicle window.

15. The system of claim 10, wherein the illuminated display comprises exterior lighting coupled to a body of the vehicle.

16. The system of claim 15, wherein generating the at least one unique identifier comprises illuminating a portion of the illuminated display corresponding to a portion of the body of the vehicle selected by the user.

17. The system of claim 10, wherein the at least one unique identifier is unique within a specified geographic region.

18. The system of claim 10, wherein generating comprises automatically selecting a previously-generated identifier associated with the user.

* * * * *